United States Patent [19]

Rosenberg

[11] Patent Number: 4,660,769

[45] Date of Patent: Apr. 28, 1987

[54] DRIP IRRIGATOR HAVING FLOAT CONTROL VALVE

[76] Inventor: Avner Rosenberg, Moshav Beit Shearim, Israel

[21] Appl. No.: 524,610

[22] Filed: Aug. 19, 1983

[30] Foreign Application Priority Data

Aug. 23, 1982 [IL] Israel .................................. 66607

[51] Int. Cl.[4] ............................................ B05B 15/00
[52] U.S. Cl. .................................................. 239/542
[58] Field of Search ................ 239/542, 547; 137/533

[56] References Cited

U.S. PATENT DOCUMENTS

| | | | |
|---|---|---|---|
| 3,767,124 | 10/1973 | Spencer | 239/542 |
| 3,777,980 | 11/1973 | Allport | 239/542 X |
| 3,810,582 | 5/1974 | Lodge | 239/542 |
| 4,014,473 | 3/1977 | Rosenberg | 239/542 |
| 4,288,035 | 9/1981 | Rosenberg | 239/542 X |
| 4,344,576 | 8/1982 | Smith | 239/542 |

FOREIGN PATENT DOCUMENTS 2829013  1/1979  Fed. Rep. of Germany ...... 239/542
2097691  11/1982  United Kingdom ................ 239/542

*Primary Examiner*—Andres Kashnikow
*Assistant Examiner*—Kevin Patrick Weldon
*Attorney, Agent, or Firm*—Benjamin J. Barish

[57] ABSTRACT

A fluid flow control device particularly useful as a multiple-emitter for drip irrigation comprises a housing defining an internal chamber and a freely-movable control member disposed within the chamber and unattached to the housing. The housing includes a waLl defining one side of the chamber and formed with an inlet opening and a plurality of outlet openings. All of these openings face the same side of the freely-movable control member and are located so as to be covered and uncovered by the same side of the control member as the control member moves towards and away from the wall of the housing. The device further includes an inlet tube for connecting the inlet opening to a source of pressurized fluid, and a plurality of outlet tubes, one connected to each of the outlet openings, for conducting the fluid exiting from the respective opening to the point of use of the fluid.

12 Claims, 3 Drawing Figures

4,660,769

DRIP IRRIGATOR HAVING FLOAT CONTROL VALVE

BACKGROUND OF THE INVENTION

The present invention relates to fluid flow control devices, and particularly to such devices useful as multiple-emitters for drip-irrigation.

My prior U.S. Pat. No. 4,288,035 discloses a fluid flow control device particularly useful as a drip-irrigation emitter. Briefly, that device comprises a housing including a control member disposed within but unattached to the housing so as to be freely movable therein, said housing including a wall formed with an inlet opening and an outlet opening both facing the same said of said control member and located so as to be covered and uncovered by said side of the control member as the control member moves towards and away from said wall of the housing.

An object of the present invention is to provide a fluid flow control device which is similar in structure and operation to the device of that Patent Specification but which is particularly useful as a multiple-emitter for drip-irrigation, namely for directing the water to flow from a common inlet of the emitter to a plurality of outlets each conducting the water to the point of the use of the water, such as to a separate plant. Another object of the invention is to provide a novel multiple-emitter having a number of significant advantages over the known ones, as will be described more particularly below.

SUMMARY OF THE INVENTION

According to the present invention, there is provided a fluid flow device particularly useful as a multiple-emitter for drip-irrigation, comprising: a housing defining an internal chamber; and a freely-movable control disc disposed within the chamber but unattached to the housing so as to be freely movable within the chamber. The house includes a wall defining one side of the chamber and formed with an inlet opening at the center of the wall, and a plurality of outlet openings arranged in a circular array around the inlet opening. All of the openings face the same side of the freely-movable control disc. The side of the control disc facing the wall of the housing is flat such that the outer perifery of the control disc effectively regulates the flow through all the outlet openings individually to maintain a substantially constant division of flow between them. The device further includes an inlet tube for connecting the inlet opening to a source of pressurized fluid, and a plurality of outlet tubes, one connected to each of the outlet openings, for conducting the fluid exiting from the respective opening to the point of use of the fluid.

The inlet opening is located centrally of the housing wall, and the outlet openings are disposed in a circular array around the inlet opening. In the described preferred embodiment, the control disc is of circular configuration and the chamber is of cylindrical configuration and has a diameter larger than that of the disc and a height of about 1.5–3 times the thickness the disc. Particularly good results have been observed when the housing chamber has a height of about two times the thickness of the disc and a diameter of about 10–20% greater than that of the disc.

A drip-irrigation multiple-emitter constructed in accordance with the foregoing features has been found to provide a number of important advantages over the known multiple-emitter devices. One important advantage is that the outputs are all controlled by a common control member, which simplifies the construction and maintenance of the device. Another advantage is that the outputs were found to have low sensitivity to the levels of the outlet tubes, or to whether one or more of the outlet tubes are open or closed; that is, the division of flow between the outputs remained uniform even when the outlets were placed at different elevations or when one outlet was closed. Thus, the multiple-emitter may advantageously be used in locations wherein there are substantial variations in the elevation of the land which would otherwise cause the output from each emitter to vary according to its particular elevation. Further, it was found that closing or opening one or more of the outlets does not significantly affect the flow from the other outlets, which is not the case in most of the other known multiple-emitters now in use. In addition, the multiple-emitter was found to exhibit a low sensitivity to line-pressure variations, and to clogging by particles in the water. Finally, such a multiple-emitter is of such simplified construction that it can be built of few and simple parts which can be produced and assembled in volume and at relatively low cost.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF PREFERRED EMBODIMENTS

Figure 1:
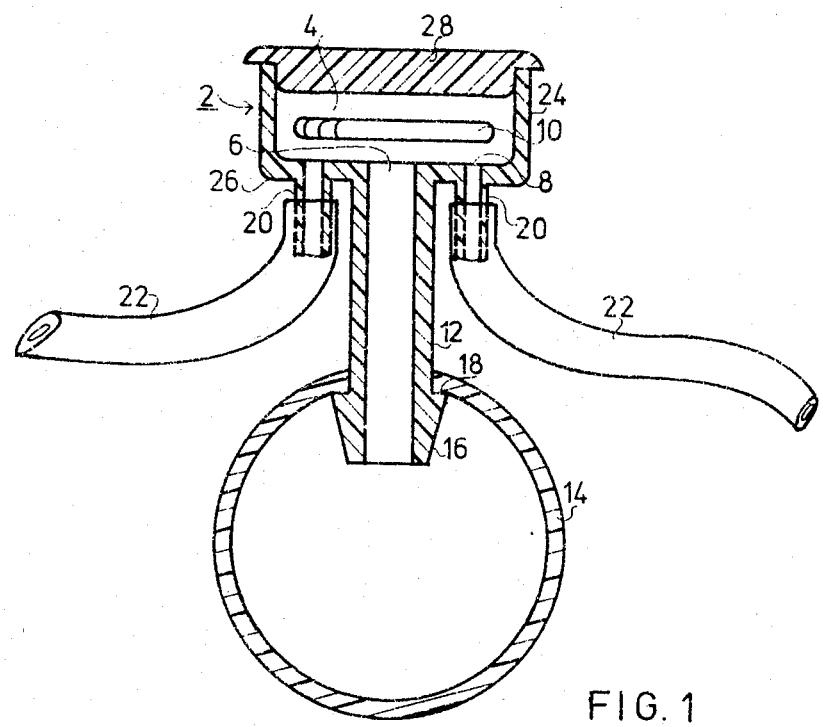
FIG. 1 is a longitudinal sectional view illustrating one form of multiple-emitter constructed in accordance with the present invention.

The device illustrated in the drawings is a multiple-emitter adapted to be applied to a pressurized water supply line for providing a slow flow or trickle of water to a plurality of locations near the emitter, such as to the root regions of a plurality of plants. Briefly, the illustrated multiple-emitter includes a housing, generally designated 2, defining an inner compartment or chamber 4 having a central water inlet opening 6 and a plurality of (six in this case) water outlet openings 8. Disposed within housing chamber 4 is a flow control member or disc 10 adapted to control the flow of the water from the inlet 6 into the compartment 4 and out therefrom through the outlets 8, as will be described more particularly below.

The inlet opening 6 communicates with an inlet tube 12 for connecting the device to a pipe 14 serving as the source of pressurized fluid, in this case pressurized water to be distributed by the multiple-emitter. Inlet tube 12 is formed at its outer end with a conical connector 16 terminating in a flat annular shoulder 18. Connector 14 is insertable by force through an opening in the wall of the water supply pipe 14 such that the flat shoulder 18 of the inlet tube bears against the inner face of the water supply pipe and forms a seal therewith by virtue of the pressure within the supply pipe.

All the outlet openings 8 are of the same diameter, which is smaller than that of the inlet opening 6. Each outlet opening 8 is formed with a short tubular or nipple 20 adapted to receive a flexible outlet tube 22 for conducting the fluid exiting from the respective outlet 8 to the point of use of the fluid, such as to the roots of the plant irrigated by the illustrated emitter.

Housing 2 is made of two sections, namely a main cylindrical section 24 formed with a circular end wall 26 at one end, and open at its opposite end; and a cap 28 press-fitted over the open end of the cylindrical section 24 for closing same. Inlet opening 6 is located centrally of wall 26 and its inlet tube 12 is integrally formed with the end-wall 26. The outlet openings 8 are formed in housing end wall 26 and are disposed in a circular array around the inlet opening 6, their outlet tubelets 20 also being integrally formed with end wall 26.

The flow control disc 10 disposed within housing chamber 4 is also of circular configuration. It is of a diameter less than the inner diameter of the chamber and of a thickness less than the height of the chamber so that the disc is freely movable within the chamber. Preferably, the height of chamber 4 is about 1.5–3 times the thickness of disc 10. Very good results have been obtained when the chamber height is about two times the disc thickness, and when the chamber diameter is about 10–20% greater than the outer diameter of the disc.

As one example, a multiple-emitter was constructed wherein the housing chamber 4 had a height of about 2 mm and a diameter of about 10 mm; the circular control disc 10 had a thickness of about 10 mm and an outer diameter of about 9.5 mm; the inlet opening 6 had a diameter of about 1.5 mm; the six outlet openings 8 all had a diameter of about 1.0 mm, and their centers were located on a circle concentric with the center of the inlet opening 6 and having a radius of about 3 mm.

Such a multiple-emitter was tested and was found to produce output flows through all six of the outlets 8 which were substantially uniform even when the ends of their respective outlet tubes 22 were at different levels, or when the flow through one or more outlet tubes was stopped. It is believed that these characteristics can be explained as follows: The water entering the housing chamber 4 through inlet tube 12 tends to move the control disc 10 away from the inlet opening 6, and also away from the outlet openings 8. However, water flowing through the outlet openings 8 produces a pressure thereat inversely proportional to the rate of flow, which tends to draw the respective portion of the control disc 10 towards the respective outlet opening. Thus, if the flow increases through one of the outlet openings 8, for example, becsause the end of its outlet tube 22 is at a lower elevation therefore more water through it from chamber 4 because of the greater head, the pressure drops at the mouth of the respective outlet opening 8 and tends to move the overlying portion of the control disc 10 towards the outlet opening, thereby restricting the opening and decreasing the flow through it. The opposite occurs if the flow through an outlet opening decreases or its terminated.

Thus, in the construction illustrated, control disc 10, being freely movable within chamber 4, automatically tends to move closer to an outlet opening 8 having a greater rate of flow thereby restricting the rate of flow, and tends to move further away from an outlet opening 8 having a lower rate of flow thereby increasing the rate of flow. Control disc 10 thus serves as a common control member for all the outlets, as well as for the inlet, to produce a multiple-emitter having low sensitivity to different elevations of the outlet tubes, to terminating the flow through one or more of the outlets, and to variations in the line pressure.

In the example described above, the center-to-center spacing of the outlet openings 8 with respect to the central inlet opening 6 is about 3 mm. It has been found that this distance can be increased, e.g., to 4 mm, in which case there will be a decrease in the rate of flow through the outlet openings. Conversely, if the center-to-center spacings of the outlet openings 8 is made less than 3 mm with respect to the inlet openings 6, there will be an increase in the rate of flow through the outlet openings.

It will be appreciated that the illustrated multiple-emitter can be constructed in volume and at low cost by injection-molding techniques, and can be quickly assembled by merely inserting the control disc 10 within housing 2 and closing the housing by press-fitting the housing cap 28 into the open end of the housing cylindrical section 24.

Figure 3:
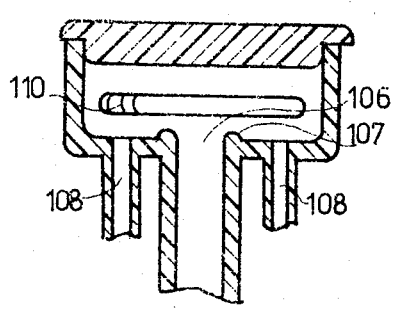
FIG. 3 is a fragmentary view, corresponding to that of FIG. 1, but illustrating a variation.
Figure 2:
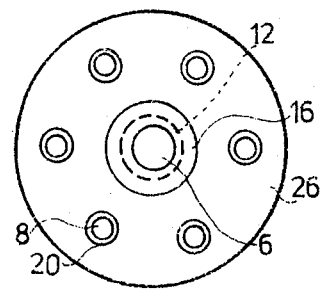
FIG. 2 is a bottom plan view illustrating the inner face of the housing in the multiple-emitter of FIG. 1.

The confronting faces of the end wall 26 and the disc 10 may be substantially flat, but not smoothly flat, so that the irregularities between the two faces will always result in some flow from the inlet to the outlets. It may be desirable, however, to provide a raised surface around the inlet opening 6, in which case the outputs of the multiple-emitter will be increased. Such a modification is illustrated in FIG. 3, wherein the raised surface around the inlet opening, therein designated 106, is defined by an annular rib 107. In this modification the control disc 110 will always be spaced slightly from the mouths of the outlet openings 108, so as to increase the rate of flow through those outlet openings.

While the invention has been described with respect to one preferred embodiment, it will be appreciated that many other variations, modifications and applications of the invention may be made.

What is claimed is:

1. A fluid flow control device particularly useful as a multiple-emitter for drip-irrigation, comprising: a housing defining an internal chamber; a freely movable control disc disposed within said chamber but unattached to the housing so as to be freely movable within the chamber; said housing including a wall defining one side of said chamber and formed with an inlet opening at the center of said wall and a plurality of outlet openings arranged in a circular array around said inlet opening; all of said openings facing the same side of said freely movable control disc; the side of said control disc facing said wall of the housing being flat such that the outer periphery of the control disc effectively regulates the flow through all the outlet openings individually to maintain a substantially constant division of flow between them; an inlet tube for connecting said inlet opening to a source of pressurized fluid; and a plurality of outlet tubes, one connected to each of said outlet openings, for conducting the fluid exiting from the respective opening to the point of use of the fluid.

2. The device according to claim 1, wherein said inlet tube is provided at its outer end with a conical connector for insertion through an opening in a pipe carrying the pressurized fluid.

3. The device according to claim 1, both said housing wall and the side of said disc facing same are flat.

4. The device according to claim 1, wherein said housing wall and the side of said disc facing same are both flat except for a slight annular rib formed around said inlet opening in said housing wall.

5. The device according to claim 1, wherein said disc is of circular configuration and said chamber is of cylindrical configuration and has a diameter larger than that of said disc and a height of about 1.5–3 times the thickness of said disc.

6. The device according to claim 5, wherein said housing chamber has a height of about two times the thickness of said disc.

7. The device according to claim 6, wherein said housing chamber has a height of about 2 mm, and said disc has a thickness of about 1 mm.

8. The device according to claim 5 wherein said housing chamber has a diameter about 10–20% greater than the outer diameter of said disc.

9. The device according to claim 8, wherein said housing chamber has a diameter of about 10 mm, and the outer diameter of said disc is about 9.5 mm.

10. The device according to claim 5, wherein said inlet opening has a diameter of about 1.5 mm, and said outlet openings each have a diameter of about 1.0 mm.

11. The device according to claim 5, wherein the centers of said outlet openings are located on a circle having a radius of about 3.0 mm and concentric with the center of said inlet opening.

12. The device according to claim 5, wherein said housing includes a cylindrical section including said wall on one side and open on the opposite side, said wall being formed with said inlet opening centrally thereof and said plurality of outlet openings therearound, said housing further including a cap press-fitted over said open end of the cylindrical housing section for closing same.

* * * * *

UNITED STATES PATENT AND TRADEMARK OFFICE
CERTIFICATE OF CORRECTION

PATENT NO. : 4,660,769

DATED : April 28, 1987

INVENTOR(S) : Avner Rosenberg

It is certified that error appears in the above-identified patent and that said Letters Patent is hereby corrected as shown below:

Column 3, line 54, before "more water" add -- drawing

Claim 3, after "according to Claim 1," add -- wherein

Signed and Sealed this

Third Day of January, 1989

Attest:

DONALD J. QUIGG

Attesting Officer      Commissioner of Patents and Trademarks